US012113885B2

United States Patent
Han et al.

(10) Patent No.: US 12,113,885 B2
(45) Date of Patent: Oct. 8, 2024

(54) HARDWARE-BASED TIME SYNCHRONIZATION FOR HETEROGENEOUS SENSORS IN AUTONOMOUS VEHICLES

(71) Applicants: TUSIMPLE, INC., San Diego, CA (US); BEIJING TUSEN ZHITU TECHNOLOGY CO., LTD., Beijing (CN)

(72) Inventors: Xiaoling Han, San Diego, CA (US); Junjun Xin, Tucson, AZ (US); Lei Nie, Tucson, AZ (US); Yue Pan, Tucson, AZ (US); Yu Zhang, Beijing (CN); Jade E. Day, Tucson, AZ (US); Zehua Huang, San Diego, CA (US); Esayas Naizghi, Tucson, AZ (US); Pingyuan Ji, Beijing (CN); Zhiqi Gong, Tucson, AZ (US)

(73) Assignees: TUSIMPLE, INC., San Diego, CA (US); BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 433 days.

(21) Appl. No.: 17/186,476

(22) Filed: Feb. 26, 2021

(65) Prior Publication Data
US 2022/0182213 A1  Jun. 9, 2022

(30) Foreign Application Priority Data
Dec. 8, 2020 (CN) .......................... 202011461771.2

(51) Int. Cl.
H04L 7/00 (2006.01)
G01C 21/16 (2006.01)
(Continued)

(52) U.S. Cl.
CPC ............ *H04L 7/0016* (2013.01); *G01C 21/16* (2013.01); *G01C 21/28* (2013.01); *G01S 17/931* (2020.01); *G01S 19/01* (2013.01); *H04L 67/12* (2013.01)

(58) Field of Classification Search
CPC ....... H04L 7/0016; H04L 67/12; G01C 21/16; G01C 21/28; G01C 21/165; G01C 21/20;
(Continued)

(56) References Cited

U.S. PATENT DOCUMENTS 7,249,272 B1 * 7/2007 Wardrop ............... H04J 3/0644
 713/400
10,802,120 B1 * 10/2020 LaChapelle ........... G01S 7/4917
(Continued)

FOREIGN PATENT DOCUMENTS

CN 104998393 A * 10/2015

OTHER PUBLICATIONS snla098a.pdf—AN-1728 IEEE 1588 Precision Time Protocol Time Synchronization Performance, Oct. 2007—Revised Apr. 2013, Texas Instruments, SNLA098A (Year: 2013).*

*Primary Examiner* — Christopher M Crutchfield
*Assistant Examiner* — Jean F Voltaire
(74) *Attorney, Agent, or Firm* — Perkins Coie LLP

(57) ABSTRACT

Devices, systems, and methods for hardware-based time synchronization for heterogenous sensors are described. An example method includes generating a plurality of input trigger pulses having a nominal pulse-per-second (PPS) rate, generating, based on timing information derived from the plurality of input trigger pulses, a plurality of output trigger pulses, and transmitting the plurality of output trigger pulses to a sensor of a plurality of sensors, wherein a frequency of the plurality of output trigger pulses corresponds to a target operating frequency of the sensor, wherein, in a case that a
(Continued)

navigation system coupled to the synchronization unit is functioning correctly, the plurality of input trigger pulses is generated based on a nominal PPS signal from the navigation unit, and wherein, in a case that the navigation system is not functioning correctly, the plurality of input trigger pulses is generated based on a simulated clock source of the synchronization unit.

17 Claims, 10 Drawing Sheets

(51) Int. Cl.
*G01C 21/28* (2006.01)
*G01S 17/931* (2020.01)
*G01S 19/01* (2010.01)
*H04L 67/12* (2022.01)

(58) Field of Classification Search
CPC ........ G01S 17/931; G01S 19/01; G01S 17/86; G01S 19/485; H04W 4/38; H04W 4/40; H04W 56/00

USPC .......................................................... 370/520
See application file for complete search history.

(56) References Cited

U.S. PATENT DOCUMENTS

| | | | |
|---|---|---|---|
| 2009/0245777 A1* | 10/2009 | Shibuno ............... | H04N 23/673 396/89 |
| 2011/0309871 A1* | 12/2011 | Miyahara ............... | G01S 19/14 327/299 |
| 2015/0204983 A1* | 7/2015 | Georgy ............... | G01S 19/396 701/469 |
| 2017/0032795 A1* | 2/2017 | Burtea ............... | H04Q 9/04 |
| 2017/0269601 A1* | 9/2017 | Jones ............... | B60W 50/06 |
| 2019/0140908 A1* | 5/2019 | Ma ............... | H04W 48/16 |
| 2019/0324449 A1 | 10/2019 | Wang et al. | |
| 2020/0064847 A1* | 2/2020 | Zhang ............... | G01S 7/484 |
| 2020/0064859 A1* | 2/2020 | Zhang ............... | G04R 20/26 |
| 2020/0210715 A1* | 7/2020 | Golomedov ........... | G06V 20/56 |
| 2021/0118251 A1* | 4/2021 | Binet ............... | G05D 1/0246 |
| 2021/0159995 A1* | 5/2021 | Zhang ............... | G01S 17/86 |
| 2022/0107401 A1* | 4/2022 | Landry ............... | G04R 20/02 |

* cited by examiner

HARDWARE-BASED TIME SYNCHRONIZATION FOR HETEROGENEOUS SENSORS IN AUTONOMOUS VEHICLES

CROSS REFERENCE TO RELATED APPLICATIONS

This patent document claims priority to Chinese Patent Application No. 202011461771.2, filed Dec. 8, 2020. The entire contents of which are incorporated by reference in their entirety.

TECHNICAL FIELD

This document generally relates to controlling vehicles, and in particular, generating computationally efficient control commands for autonomous vehicles.

BACKGROUND

Autonomous vehicle navigation is a technology for sensing the position and movement of a vehicle and, based on the sensing, autonomously control the vehicle to navigate towards a destination. Autonomous vehicles have important applications in transportation of people, goods and services. Ensuring accurate synchronization between the different sensors that aid navigation and other functionality of autonomous driving is paramount for the safety of the vehicle and its passengers, as well as people and property in the vicinity of the vehicle.

SUMMARY

Disclosed are devices, systems and methods for hardware-based time synchronization for heterogenous sensors are described. In an example, this is achieved by generating an output set of trigger pulses based on timing information in an input set of trigger pulses such that a frequency of the output set of trigger pulses matches a target operating frequency of a sensor. Multiple sensors are thus synchronized by generating output sets of trigger pulses, each of which match a target operating frequency of the respective sensor.

In an aspect, the disclosed technology can be used to provide a method of synchronization in a vehicle. This method includes generating, by a synchronization unit, a plurality of input trigger pulses having a nominal pulse-per-second (PPS) rate, generating, based on timing information derived from the plurality of input trigger pulses, a plurality of output trigger pulses, and transmitting the plurality of output trigger pulses to a sensor of a plurality of sensors, wherein a frequency of the plurality of output trigger pulses corresponds to a target operating frequency of the sensor, wherein, in a case that a navigation system coupled to the synchronization unit is functioning correctly, the plurality of input trigger pulses is generated based on a nominal PPS signal from the navigation unit, and wherein, in a case that the navigation system is not functioning correctly, the plurality of input trigger pulses is generated based on a simulated clock source of the synchronization unit.

In another aspect, the disclosed technology can be used to provide a system for synchronization in a vehicle. This system includes a sensor to provide sensing capabilities for vehicle navigation and functioning at a target operating frequency, a first navigation unit, a first synchronization unit, coupled to the sensor and the first navigation unit, to generate a plurality of input trigger pulses having a nominal pulse-per-second (PPS) rate, generate, based on timing information derived from the plurality of input trigger pulses, a plurality of output trigger pulses, and transmit the plurality of output trigger pulses to the sensor, a second navigation unit, and a second synchronization unit, coupled to the sensor and the second navigation unit, to transmit the plurality of output trigger pulses to the sensor, wherein a frequency of the plurality of output trigger pulses corresponds to the target operating frequency of the sensor, wherein, in a case that the first navigation system is functioning correctly, the plurality of input trigger pulses is generated based on a nominal PPS signal from the first navigation unit, and wherein, in a case that the first navigation unit is not functioning correctly, the plurality of input trigger pulses is generated based on a simulated clock source of the first synchronization unit.

In another aspect, the above-described method is embodied in the form of processor-executable code and stored in a computer-readable program medium.

In yet another aspect, a device that is configured or operable to perform the above-described method is disclosed. The device may include a processor that is programmed to implement this method.

The above and other aspects and features of the disclosed technology are described in greater detail in the drawings, the description and the claims.

DETAILED DESCRIPTION

Figure 1:
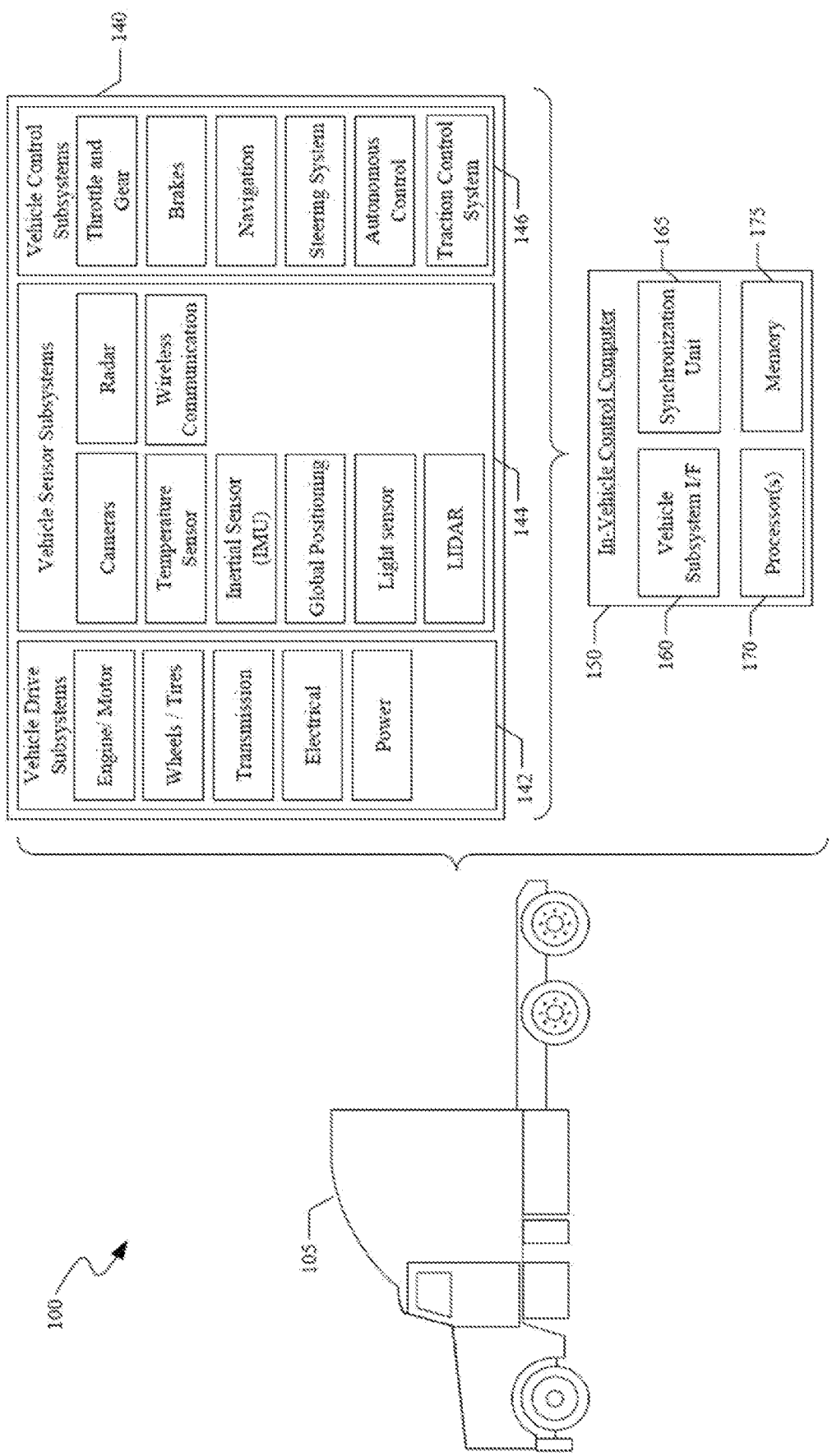
FIG. 1 shows a block diagram of an example vehicle ecosystem in which an in-vehicle control computer located in the vehicle comprises a synchronization unit that can synchronize multiple heterogeneous sensors.

The transportation industry has been undergoing considerable changes in the way technology is used to control the operation of the vehicles. As exemplified in the automotive passenger vehicle, there has been a general advancement towards shifting more of the operational and navigational decision making away from the human driving and into on-board computing power. This is exemplified in the extreme by the numerous under-development autonomous vehicles. Current implementations are in intermediate stages, such as the partially-autonomous operation in some vehicles (e.g., autonomous acceleration and navigation, but with the requirement of a present and attentive driver), the safety-protecting operation of some vehicles (e.g., maintaining a safe following distance and automatic braking), the safety-protecting warnings of some vehicles (e.g., blind-spot indicators in side-view mirrors and proximity sensors), as well as ease-of-use operations (e.g., autonomous parallel parking).

Any level of autonomous navigation relies on multiple sensors (e.g., cameras, LiDAR (light detection and ranging), radar, ultrasonic, etc.), all of which need to work in a synchronous manner. When an object appears in the field-of-view (FOV) of each sensor, the sensor begins processing the input data, and outputs image information when the processing is complete. However, due to the varying complexities of different sensors, the output of the different sensors will be available at different times even though the object appeared at the same time. In another example, similar sensors working at different frame rates will also output their results at different times. If the starting points for acquisition and/or processing in the multiple sensors are not aligned, the output will be not be aligned either.

Existing systems do not provide technical solutions that enable the synchronization of multiple sensors as described in this patent document. In an example, for a typical L2 system (i.e., an autonomous vehicle that includes an advanced driver assistance systems, which controls steering, acceleration and deceleration, but which always requires a human driver), accurate time synchronization is not needed since the sensors are free-running. Generally, in these systems, the update frequency of the sensors can be set up, and the sensors operate in a standalone manner and output the signal regardless of whether the information is needed or not. In these L2 systems, there is typically no "trigger" requirement, and the systems are only configured to ensure that all sensors are not susceptible to frame drop.

In another example, for advanced L2+ or L3 systems (i.e., autonomous systems that feature "environmental detection" capabilities which can make informed decisions, but require a driver to remain alert and ready to take control), additional sensors are added to the system and a software trigger system may be installed to send out software trigger messages to different sensors as required. The software trigger system may be configured to send trigger messages to different sensors at the same time or in a time shifted manner. However, software trigger systems are not very reliable, and it is likely that the triggers may be lost if they are transmitted by a public Ethernet network.

In yet another example, existing systems do not implement the redundant hardware necessary to meet Automotive Safety Integrity Level D (ASIL D) requirements because they require continuous human supervision and intermittent human intervention. Independent time sources, and aligning their timestamps, is typically not implemented in existing systems.

FIG. 1 shows a block diagram of an example vehicle ecosystem 100 in which an in-vehicle control computer 150 located in the autonomous vehicle 105 includes a synchronization unit that synchronizes multiple heterogeneous sensors. As shown in FIG. 1, the autonomous vehicle 105 may be a semi-trailer truck. The vehicle ecosystem 100 includes several systems and components that can generate and/or deliver one or more sources of information/data and related services to the in-vehicle control computer 150 that may be located in an autonomous vehicle 105. The in-vehicle control computer 150 can be in data communication with a plurality of vehicle subsystems 140, all of which can be resident in the autonomous vehicle 105. The in-vehicle computer 150 and the plurality of vehicle subsystems 140 can be referred to as autonomous driving system (ADS). A vehicle subsystem interface 160 is provided to facilitate data communication between the in-vehicle control computer 150 and the plurality of vehicle subsystems 140. In some embodiments, the vehicle subsystem interface 160 can include a controller area network controller to communicate with devices in the vehicle subsystems 140.

The autonomous vehicle 105 may include various vehicle subsystems that support of the operation of autonomous vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems or one or more components or devices can be removed. The vehicle drive subsystem 142 may include components operable to provide powered motion for the autonomous vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment in which the autonomous vehicle 105 is operating or a condition of the autonomous vehicle 105. The vehicle sensor subsystem 144 may include one or more cameras or image capture devices, one or more temperature sensors, an inertial measurement unit (IMU), a Global Positioning System (GPS) device, a laser range finder/LiDAR unit, a RADAR unit, and/or a wireless communication unit (e.g., a cellular communication transceiver). The vehicle sensor subsystem 144 may also include sensors configured to monitor internal systems of the autonomous vehicle 105 (e.g., an 02 monitor, a fuel gauge, an engine oil temperature, etc.). In some embodiments, the vehicle sensor subsystem 144 may include sensors in addition to the sensors shown in FIG. 1.

The IMU may include any combination of sensors (e.g., accelerometers and gyroscopes) configured to sense position and orientation changes of the autonomous vehicle 105 based on inertial acceleration. The GPS device may be any sensor configured to estimate a geographic location of the autonomous vehicle 105. For this purpose, the GPS device may include a receiver/transmitter operable to provide information regarding the position of the autonomous vehicle 105 with respect to the Earth. The RADAR unit may represent a system that utilizes radio signals to sense objects within the environment in which the autonomous vehicle 105 is operating. In some embodiments, in addition to sensing the objects, the RADAR unit may additionally be configured to sense the speed and the heading of the objects proximate to the autonomous vehicle 105. The laser range finder or LiDAR unit may be any sensor configured to sense objects in the environment in which the autonomous vehicle 105 is located using lasers. The LiDAR unit may be a spinning LiDAR unit or a solid-state LiDAR unit. The cameras may include one or more cameras configured to capture a plurality of images of the environment of the autonomous vehicle 105. The cameras may be still image cameras or motion video cameras.

The vehicle control subsystem 146 may be configured to control operation of the autonomous vehicle 105 and its components. Accordingly, the vehicle control subsystem 146 may include various elements such as a throttle and gear, a brake unit, a navigation unit, a steering system and/or an autonomous control unit. The throttle may be configured to control, for instance, the operating speed of the engine and, in turn, control the speed of the autonomous vehicle 105. The gear may be configured to control the gear selection of the transmission. The brake unit can include any combination of mechanisms configured to decelerate the autonomous vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more predetermined maps so as to determine the driving path for the autonomous vehicle 105. The steering system may represent any combination of mechanisms that may be operable to adjust the heading of autonomous vehicle 105 in an autonomous mode or in a driver-controlled mode.

The autonomous control unit may represent a control system configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some embodiments, the autonomous control unit may be configured to incorporate data from the GPS device, the RADAR, the LiDAR, the cameras, and/or other vehicle subsystems to determine the driving path or trajectory for the autonomous vehicle 105.

The traction control system (TCS) may represent a control system configured to prevent the autonomous vehicle 105 from swerving or losing control while on the road. For example, TCS may obtain signals from the IMU and the engine torque value to determine whether it should intervene and send instruction to one or more brakes on the autonomous vehicle 105 to mitigate the autonomous vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the autonomous vehicle 105 can be controlled by the in-vehicle control computer 150. The in-vehicle control computer 150 may include at least one processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the autonomous vehicle 105 in a distributed fashion. In some embodiments, the memory 175 may contain processing instructions (e.g., program logic) executable by the processor 170 to perform various methods and/or functions of the autonomous vehicle 105, including those described for the synchronization unit 165 as explained in this patent document. For instance, the processor 170 executes the operations associated with synchronization unit 165 for synchronizing multiple heterogeneous sensors that are functioning at distinct target operating frequencies. The operations of the synchronization unit 165 are further described in this patent document.

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 may control the function of the autonomous vehicle 105 based on inputs received from various vehicle subsystems (e.g., the vehicle drive subsystem 142, the vehicle sensor subsystem 144, and the vehicle control subsystem 146).

Figure 2:
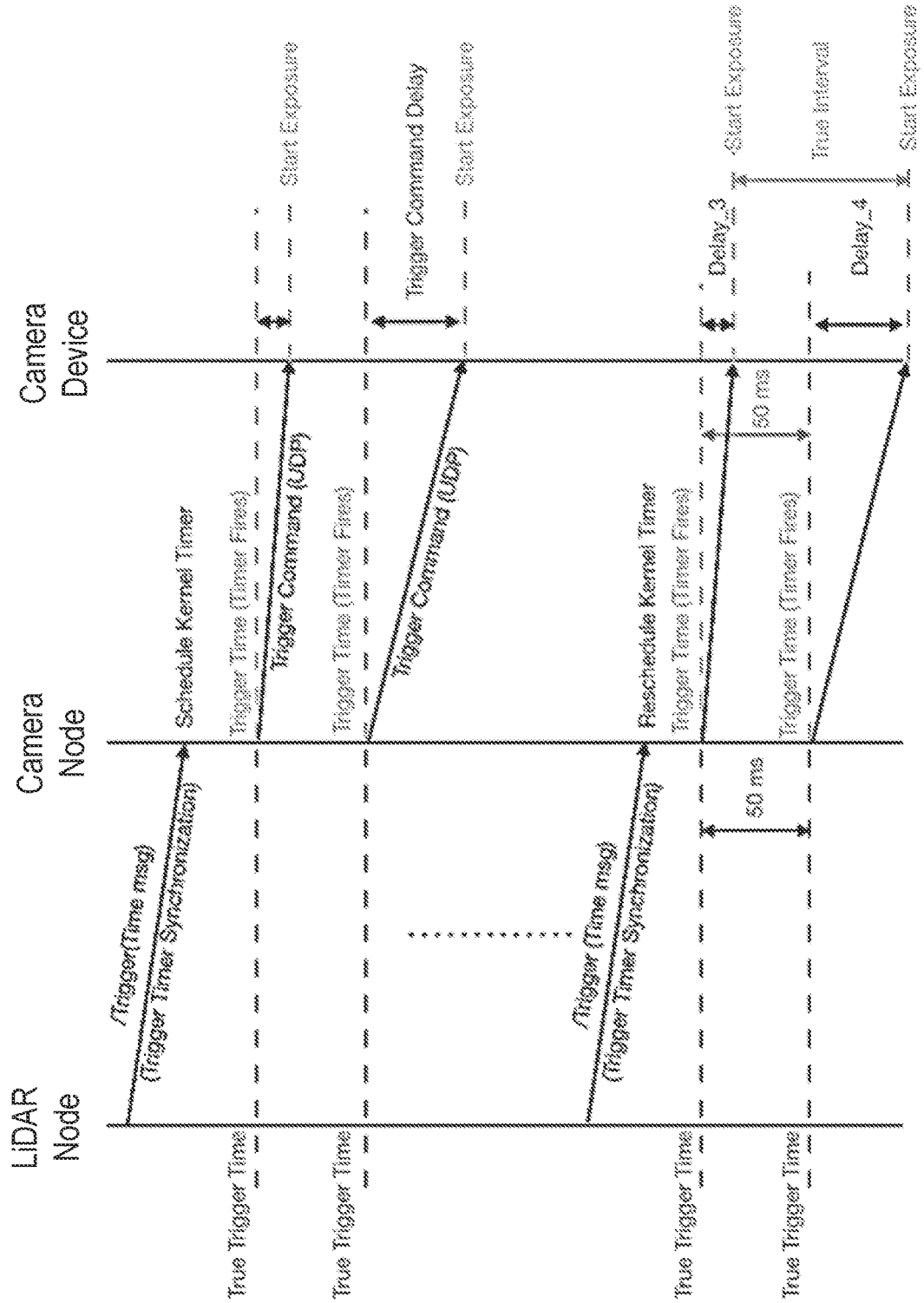
FIG. 2 shows an example of timing discrepancies between different sensors.

FIG. 2 shows an example of timing discrepancies between different sensors caused by using a software trigger system. As shown therein, a timing discrepancy results between the triggering of a LiDAR node and a camera device due to the propagation of the trigger command via the UDP protocol. In FIG. 2, the "True Trigger Time" corresponds to the absolute time of the LiDAR sensor turning to a specific angle, the "Trigger Time (Timer Fires)" corresponds to the time when the camera node sends out a trigger command to the camera device through the UDP protocol. When the camera device received the UDP trigger command, it starts the exposure. Thus, the "Trigger Command Delay" is the difference between the time of starting the exposure at the camera device and the time of sending out the trigger command from the camera node.

The resulting timing discrepancy is reflected in the fact that the nominal time interval between two frames is 50 ms (as shown for the LiDAR node), whereas the true time interval is determined as ((Delay_4−Delay_3)+50) ms, which is primarily because of the delay of the UDP transmission of the trigger command.

Embodiments of disclosed technology, which are directed to hardware-based time synchronization of heterogenous sensors, overcome the drawbacks discussed in FIG. 2. The described embodiments include the generation of hardware and/or software trigger pulses with different frequencies and duty cycles for different sensors, and a time stamp synchronization service, which can provide, in an example, a higher level of time synchronization for autonomous driving systems.

Figure 3:
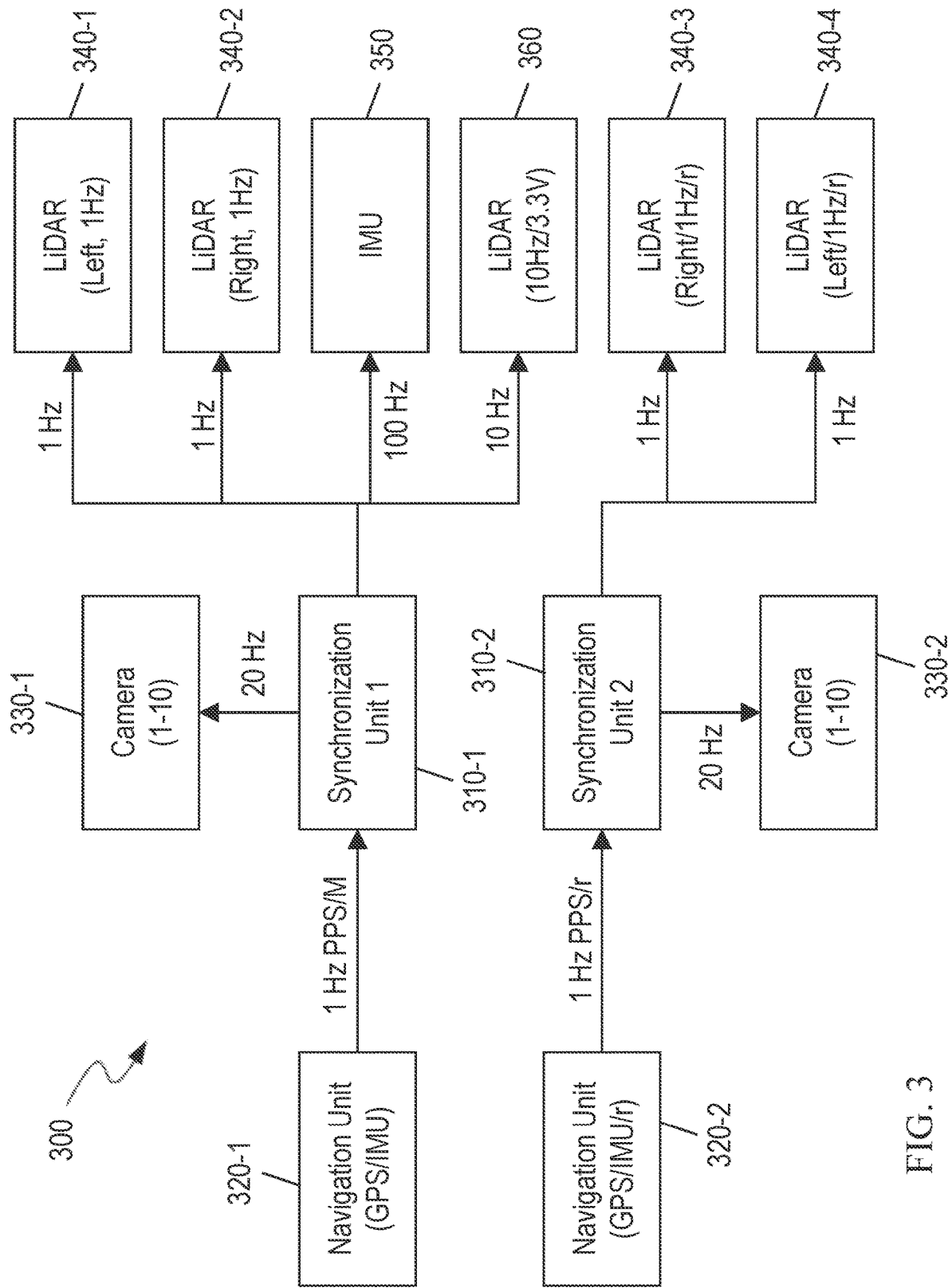
FIG. 3 shows a block diagram of an example system for synchronization.

FIG. 3 shows a block diagram of an example system 300 for synchronization, which includes the following subcomponents:
  a first navigation system (320-1),
  a second (redundant) navigation system (320-2),
  a first synchronization unit (310-1) coupled to the first
    navigation system (320-1), and
    a first camera (330-1),
    a first left LiDAR unit (340-1),
    a first right LiDAR unit (340-2),
    an inertial measurement unit (IMU) (350), and
    a central LiDAR unit (360),
  a second synchronization unit (310-2) coupled to the
    second navigation system (320-2), and
    a second camera (330-2),
    a second (redundant) left LiDAR unit (340-4), and
    a second (redundant) right LiDAR unit (340-3).

Embodiments of the disclosed technology are directed to deliver a hardware-based trigger signal with a frequency different from the 1 Hz pulse-per-second (PPS) signal from the navigation unit to each sensor that operates at the corresponding different target frequency.

In some embodiments, the first synchronization unit 310-1 functions as a centralized hardware trigger distribution center. As discussed above, it can be configured to send a trigger pulse to different sensors are different frequencies that match the operating frequency of the corresponding sensor. In an example, the first camera 330-1 operates at 20 Hz, so the first synchronization unit 310-1 generates a 20 Hz signal for the first camera 330-1. In another example, the inertial measurement unit (IMU) 350 operates at 100 Hz, so the first synchronization unit 310-1 generates a 100 Hz signal for the IMU 350.

In some embodiments, the autonomous vehicle is outfitted with multiple IMUs in various locations (e.g., roof, cabin, chassis, sensor rack, etc.), and embodiments of the disclosed technology advantageously ensure that each of the multiple IMUs are synchronized.

In some embodiments, the hardware trigger source is a 1 Hz pulse-per-second (PPS) signal that is received from a navigation system (e.g., a Global Positioning System (GPS) unit). As shown in FIG. 3, the first navigation system 320-1 provides the 1 Hz PPS signal to the first synchronization unit 310-1 and the second (redundant) navigation system 320-2 provides the 1 Hz PPS signal to the second synchronization unit 310-2.

The 1 Hz PPS signal is available only when the navigation units are functioning correctly. In some embodiments, the 1 Hz PPS signal may not be available due to blocking (e.g., the GPS signal being blocked by tall building or terrain with respect to the receiver position), device errors, GPS signal jamming, etc. In these scenarios, the first and second synchronization units are configured to generate a simulated PPS signal to keep the whole system running. In an example, a PPS signal that substantially matches the 1 Hz PPS signal typically received from the navigation units is generated based on a simulated clock in the synchronization units.

In some embodiments, as shown in FIG. 3, the second synchronization unit 310-2 which is coupled to a second navigation unit 320-2 provides redundancy for the first synchronization unit 310-1 to ensure that the hardware trigger is always reliably available, which is paramount in autonomous driving applications. In an example, the first and second synchronization units can be configured to share information either constantly or on a periodic basis. In another example, one of the synchronization units can be configured to take over completely if an error or failure signal is received from the other synchronization unit.

In some embodiments, the hardware trigger generated by the synchronization unit is transmitted to the camera to control the shutter of the camera to take a picture. In an example, the hardware trigger controls (or gates) the exposure starting time of the camera. In another example, the first and second synchronization units generate the hardware trigger for the first and second camera at 20 Hz to match the target operating frequency of the camera systems.

In some embodiments, the hardware trigger generated by the synchronization unit is transmitted to a spinning (or rotating) LiDAR unit to control the 0 degree phase of the LiDAR unit. In an example, receiving the hardware trigger resets the spinning LiDAR unit to the 0 degree phase. In another example, the first and second synchronization units generate the hardware trigger for the left and right spinning LiDAR units at 1 Hz to match the target operating frequencies of the units.

In some embodiments, the hardware trigger generated by the synchronization unit is transmitted to a solid-state LiDAR unit 360 to control scanning starting point of the LiDAR unit. In an example, receiving the hardware trigger resets the scanning starting point of the solid-state LiDAR unit. In another example, the second synchronization unit generates the hardware trigger for the solid-state LiDAR unit at 10 Hz to match the target operating frequency of the unit.

In some embodiments, the hardware trigger generated by the synchronization unit is transmitted to an inertial measurement unit (IMU) 350 to control the sampling starting time. In an example, receiving the hardware trigger resets the starting time of the sampling operation of the IMU. In another example, the first synchronization unit generates the hardware trigger for the IMU at 100 Hz to match the target operating frequency of the unit.

In some embodiments, the rising edge of a pulse in the 1 Hz PPS signal is aligned with the rising edges of the hardware triggers (with different operating target frequencies) sent to the sensors. In an example, aligning the rising edges across the heterogenous sensor enables jitter and skew effects to be mitigated.

In some embodiments, the synchronization unit can is configured to enable the coordinated operation of the heterogenous sensors to accurately capture an object that has entered the field-of-view of the autonomous vehicle sensors. In an example, the autonomous vehicle can support multiple cameras pointed in multiple directions, and when the spinning LiDAR unit is rotated to a specific orientation, the cameras that point in that direction receive a hardware trigger to start the exposure. This advantageously enables the multiple sensing outputs to matched more accurately to enable higher detection rates of external objects.

Figure 4:
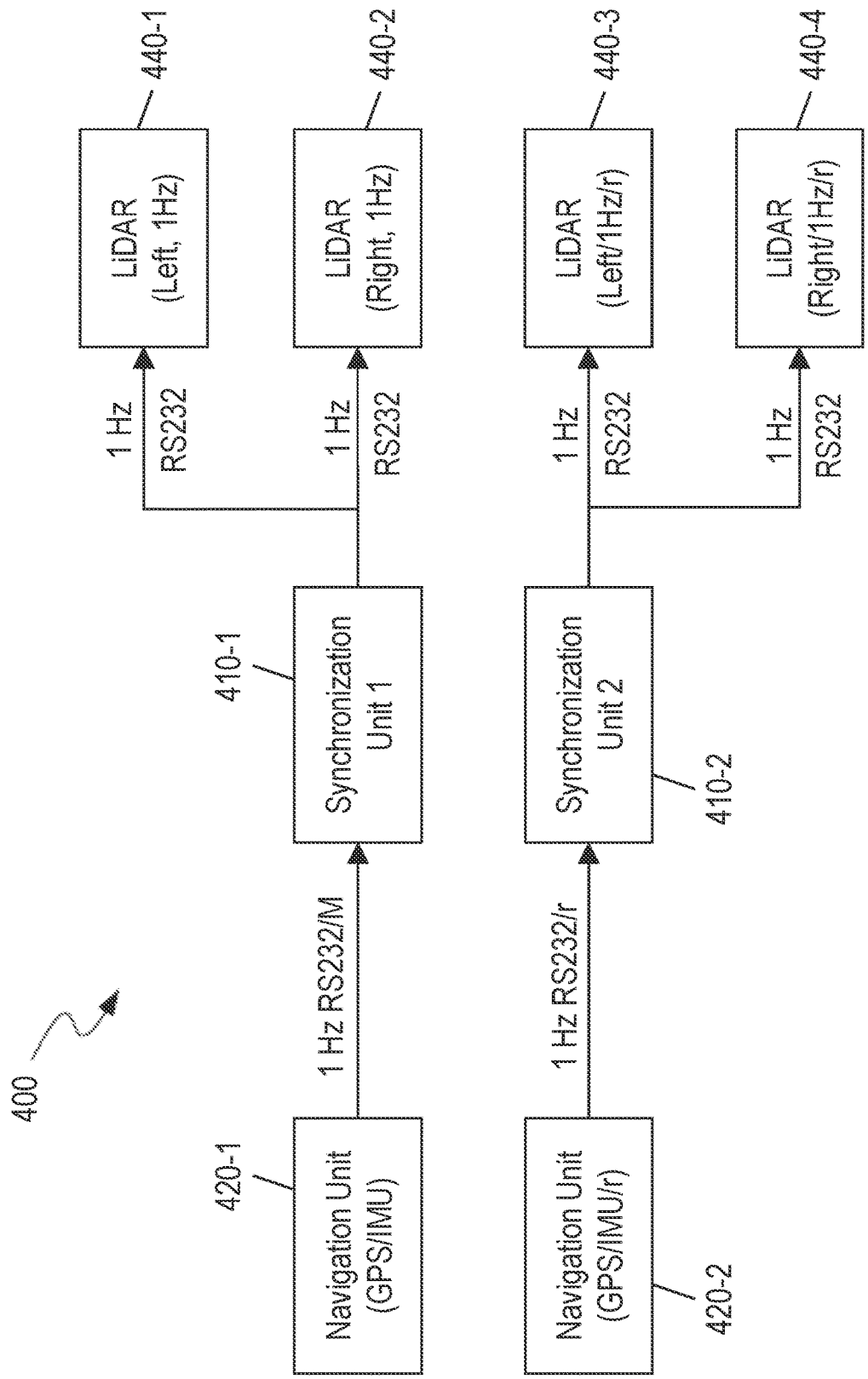
FIG. 4 shows a block diagram of another example system for synchronization.
Figure 5:
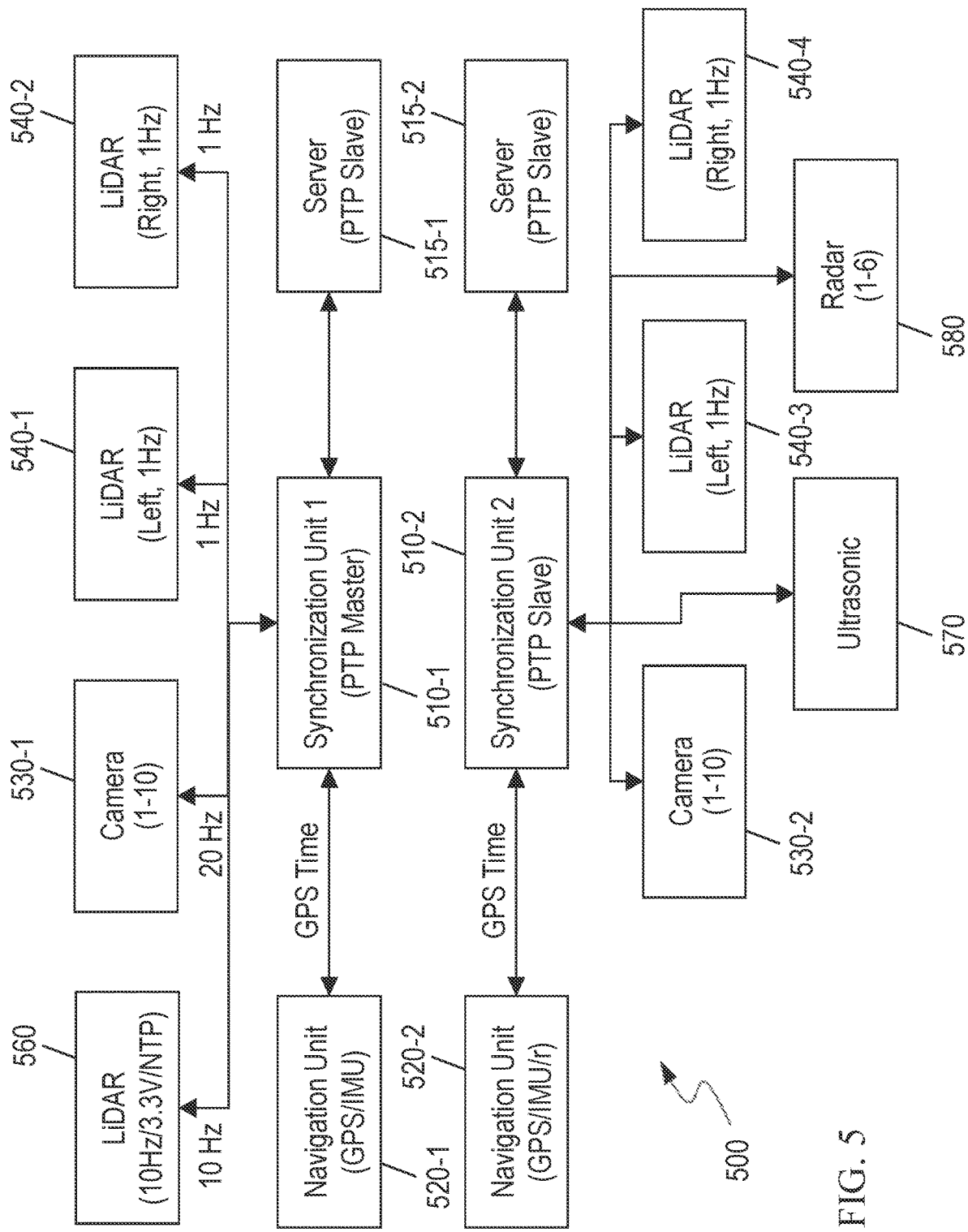
FIG. 5 shows a block diagram of yet another example system for synchronization.

In some embodiments, the synchronization system receives the absolute time, as shown in the example in FIGS. 4 and 5.

FIG. 4 shows a block diagram of another example system 400 for synchronization. This example includes some features and/or (sub)components that are similar to those shown in FIG. 3, and described above. At least some of these features and/or (sub)components may not be separately described in this section. As shown therein, the system includes the following subcomponents:

a first navigation system (420-1),
a second (redundant) navigation system (420-2),
a first synchronization unit (410-1) coupled to the first navigation system (420-1), and
a first left LiDAR unit (440-1), and
a first right LiDAR unit (440-2),
a second synchronization unit (410-2) coupled to the second navigation system (420-2), and
a second (redundant) left LiDAR unit (440-3), and
a second (redundant) right LiDAR unit (440-4).

In some embodiments, as shown in FIG. 4, a timing signal from a universal asynchronous receiver-transmitter (UART)/RS232 interface is received at the first and second synchronization units (410-1 and 410-2, respectively), and sent directly to the spinning LiDAR units (440-1 through 440-4). In an example, the UART timing signal that includes a timestamp that corresponds to the absolute time. In another example, as described previously, transmitting the absolute time via UART/RS232 to the synchronization unit (instead of directly to the sensors) advantageously enables the data chain to be monitored so that a failure can be detected, and a simulated signal can be generated if a failure in the navigation system is detected.

FIG. 5 shows a block diagram of yet another example system 500 for synchronization. This example includes some features and/or (sub)components that are similar to those shown in FIGS. 3 and 4, and described above. At least some of these features and/or (sub)components may not be separately described in this section. As shown therein, the system includes the following subcomponents:
- a first navigation system (520-1),
- a second (redundant) navigation system (520-2),
- a first Precision Time Protocol (PTP) (slave) server (515-1),
- a second PTP (slave) server (515-2),
- a first synchronization (PTP master) unit (510-1) coupled to the first navigation system (520-1), the first PTP server (515-1), and
  - a first left LiDAR unit (540-1),
  - a first right LiDAR unit (540-2),
  - a first camera (530-1), and
  - a central LiDAR unit (560),
- a second synchronization (PTP slave) unit (510-2) coupled to the second navigation system (520-2), the second PTP server (515-2), and
  - a second left LiDAR unit (540-3),
  - a second right LiDAR unit (540-4),
  - a second camera (530-2),
  - an ultrasonic sensor (570), and
  - a radar unit (580).

In some embodiments, as shown in FIG. 5, the each of the heterogenous sensors, as well as the second synchronization unit (PTP slave) 510-2, receives the absolute time using the PTP service provided by the first synchronization unit (PTP master) 510-1 or a separate navigation (e.g., GPS) source. In an example, if the first synchronization unit experiences a failure, then the second synchronization unit can be used to support and provide the PTP service.

In some embodiments, the nominal PPS signals from the first and second navigation units are aligned to ensure that the system is operating correctly. In an example, the first and second synchronization units cross-check timestamps from the two navigation units to ensure that the difference between the timestamps is less than a predetermined threshold (e.g., sub-millisecond or less). If the difference exceeds the threshold, an error condition is triggered and the vehicle switches operation from a default operating mode to a minimal risk condition (MRC) mode in which, for example, the vehicle comes to a gentle stop in its lane or pulls over to the nearest pre-designated safety location.

As shown in FIG. 5, the first and second synchronization units are coupled to independent navigation units and PTP sources. In some embodiments, the two synchronization units are configured to exchange heartbeat messages, which are periodic signals generated by hardware or software components to indicate normal operation. In an example, an interruption in the periodic exchange of heartbeat messages is indicative of either the PTP master or PTP slave service failing, in which case the functional synchronization unit will take over and provide timing information to all onboard components (e.g., via broadcasting).

In some embodiments, the central LiDAR unit supports the Network Time Protocol (NTP) for clock synchronization. The ultrasonic sensor is able to see through objects and can operate in bad weather (e.g., rain, snow, dust), as well as in the presence of fog and low-light night-time situation, thereby overcome some of the disadvantages of LiDAR units and cameras, respectively.

The embodiments described in FIGS. 3-5 include a first synchronization unit and a second synchronization unit, which can both be configured, in an example, to function as masters. If one of the synchronization units acts abnormally, the other synchronization unit can propagate the trigger signals to ensure continuous reliable operation.

In some embodiments, the first and second synchronization units are configured to use the same signal source clock (e.g., the PPS signal) from a Global Positioning System (GPS) unit. This ensures that if one of the synchronization units malfunctions (e.g., network signal is poor, failure of signal acquisition, acquired data cannot be decoded), the PPS signal can be obtained from the other synchronization unit.

In some embodiments, the first and second synchronization units are configured to ensure that if both synchronization units experience a failure, then the system time of the synchronization unit that has been pre-designated as the master device in a configuration file is used to propagate the trigger signals.

Furthermore, the embodiments described in FIGS. 3-5 provide at least the following advantages:
- establishing a stable frame rate output, e.g., a frame drop rate of $10^{-6}$ with a reliable time synchronization availability status of >99.9%,
- reducing the latency for a single sensor below a predetermined threshold, and
- controlling the time variance between the heterogeneous sensors.

Figure 6:
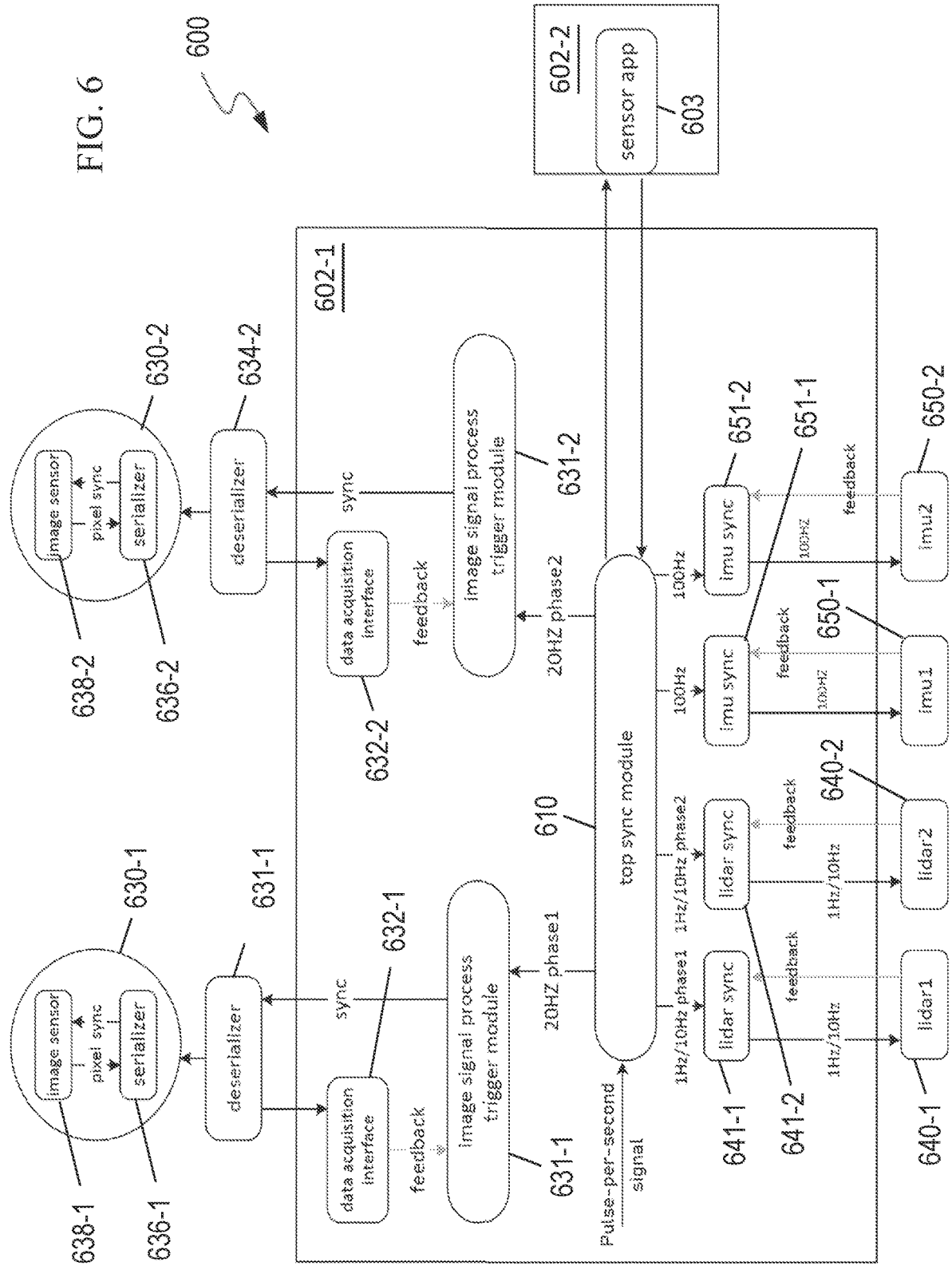
FIG. 6 shows a block diagram of an example synchronization unit.

FIG. 6 shows a block diagram of an example synchronization unit 600, e.g., the synchronization unit shown in FIGS. 3-5. As shown in FIG. 6, the synchronization unit include a top-level synchronization module (denoted "top sync module" 610 in FIG. 6), which receives the PPS signal and controls the hardware triggers and synchronizations for all the sensors, which may include LiDAR, IMU and image sensors. As discussed above, the PPS signal is a basic trigger signal, which is scaled to different frequencies in the top-level synchronization module and then sent to the different sensors. In an example, the phase of the individual trigger signals sent to the sensors can be adjusted in the top-level synchronization module.

In this example, the synchronization unit is implemented on a field programmable gate array (FPGA) 602-1, which is configured to bidirectionally communicate with the sensor application 603 on the ARM processor 602-2. Herein, the sensor feedback provided by the FPGA 602-1 to the ARM processor 602-2 can provide the actual triggered frequency of a sensor, and can be used to detect abnormalities by comparing it with the frequency provided by the "top sync module" 610.

Continuing with the description of FIG. 6, the top-level synchronization module 610 interfaces with synchronization modules for each of the sensors (e.g., the "lidar sync" (641-1 and 641-2) for the "lidar1" 640-1 and "lidar2" 640-2 sensors (640-1 and 640-2, respectively), and the "imu sync" (651-1 and 651-2) for the "imu1" and "imu2" sensors (650-1 and 650-2, respectively)). Each of the sensor synchronization modules controls synchronization of the respective sensor, and controls the sensors themselves to accurately operate based on the received trigger signals.

The top-level synchronization module 610 also interfaces with an "image sensor process trigger module" (631-1 and 631-2) for each "image sensor" (638-1 and 638-2, respectively). As shown in FIG. 6, the image sensor package (630-1 or 630-2) includes the image sensor (638-1 or 638-2, respectively) and a data interface (636-1 or 636-2, respectively, and for example, a serializer interface) that exchange pixel and synchronization information, and the "image sensor process trigger module" (631-1 and 631-2) communicates with the image sensor package using another data interface (634-1 and 634-2, respectively, and for example, a deserializer interface). The "image sensor process trigger module" also interfaces with a data acquisition interface (632-1 and 632-2, respectively, and for example, the mobile industry processor interface (MIPI), which supports a standard image data transmission protocol), which can provide feedback from the image sensor package. In an example, the image sensor package is a high-resolution camera.

In the embodiments shown in FIGS. 3-6, the hardware trigger signal for each of the sensors is generated at distinct frequencies from a common PPS signal from a GPS unit. In an example, a 100 MHz clock is used to sample the PPS signal, and detect an interval between consecutive rising edges of the PPS signal. An average value of the interval between consecutive rising edges is computed over a predetermined number of cycles (e.g., 4 cycles) to generate a value of the PPS interval (denoted T). In the case of the image sensor, the PPS interval is then divided by 20 to obtain an interval of T/20, which corresponds to a frequency of 20 Hz, which is then transmitted to the image sensor as the hardware trigger signal for that sensor. In general, an N Hz trigger signal is generated by dividing the PPS interval by N to obtain an interval of T/N, which corresponds to the required frequency of N Hz. As shown in the example embodiments in FIGS. 3-6, N=1 or N=10 for the LiDAR sensor, and N=100 for the IMU.

FIG. 7A-7D show examples of frequency stability for different camera sensors. Each of the plots shown therein plot the frame drop rate (% of total frames dropped) as a function of window number (the time duration in which a predetermined amount of data is processed) for different camera sensors (e.g., camera #2, #3, #5 and #6 shown in FIG. 7A-7D, respectively).

Figure 7B:
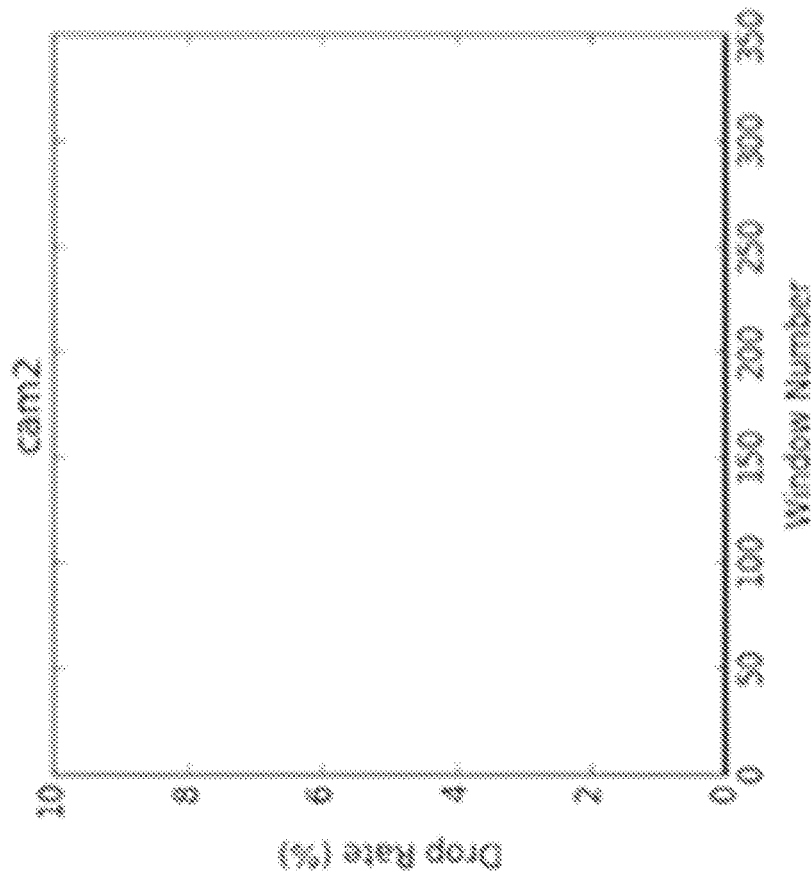
FIG. 7A-7D show examples of frequency stability for different camera sensors.
Figure 7A:
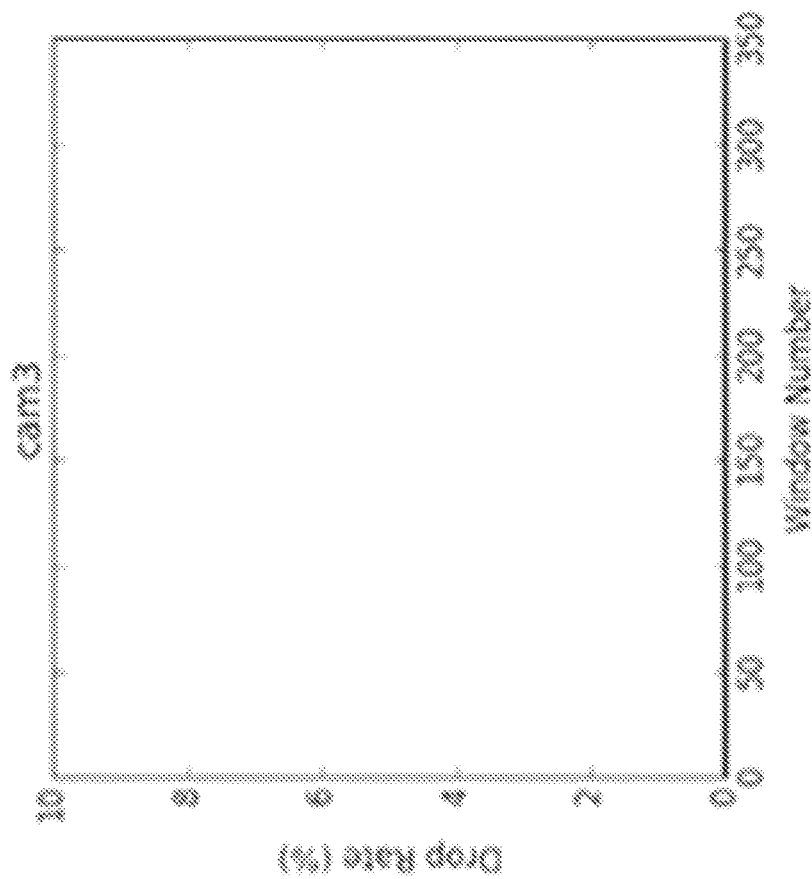
Figure 7D:
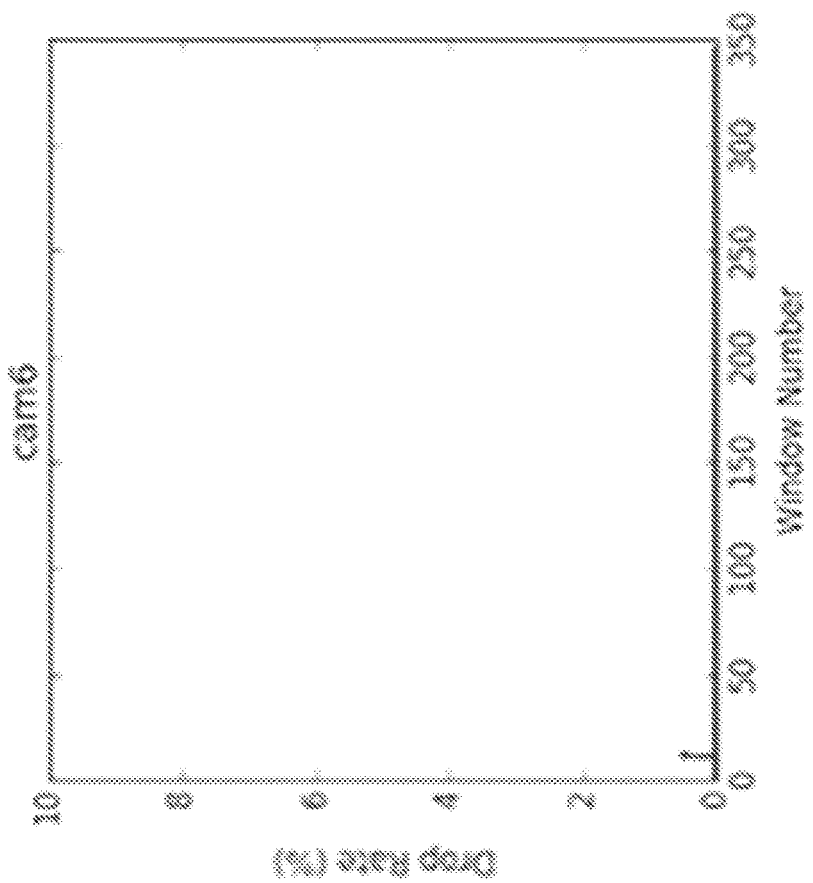
Figure 7C:
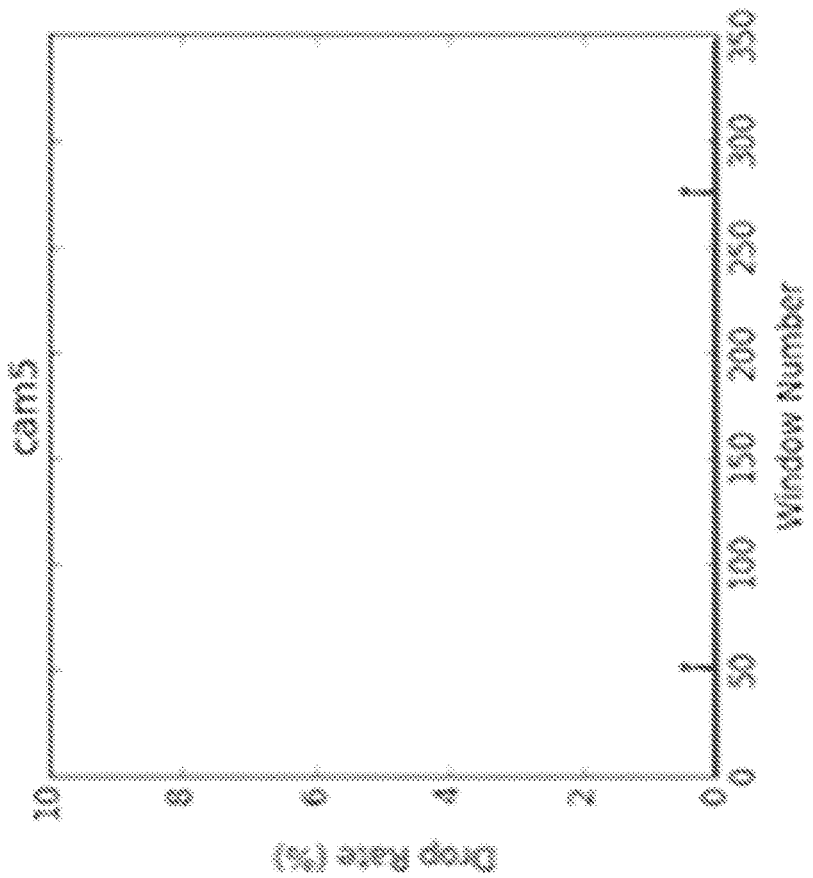

In this example, each of the plots cover ~54000 frames, wherein FIGS. 7A and 7B show no frames dropped, and FIGS. 7C and 7D show two and one instances of two dropped frames, respectively. As shown herein, embodiments of the disclosed technology can provide a frame drop rate of approximately $4 \times 10^{-5}$%, which is significantly better than existing methods.

Figure 8:
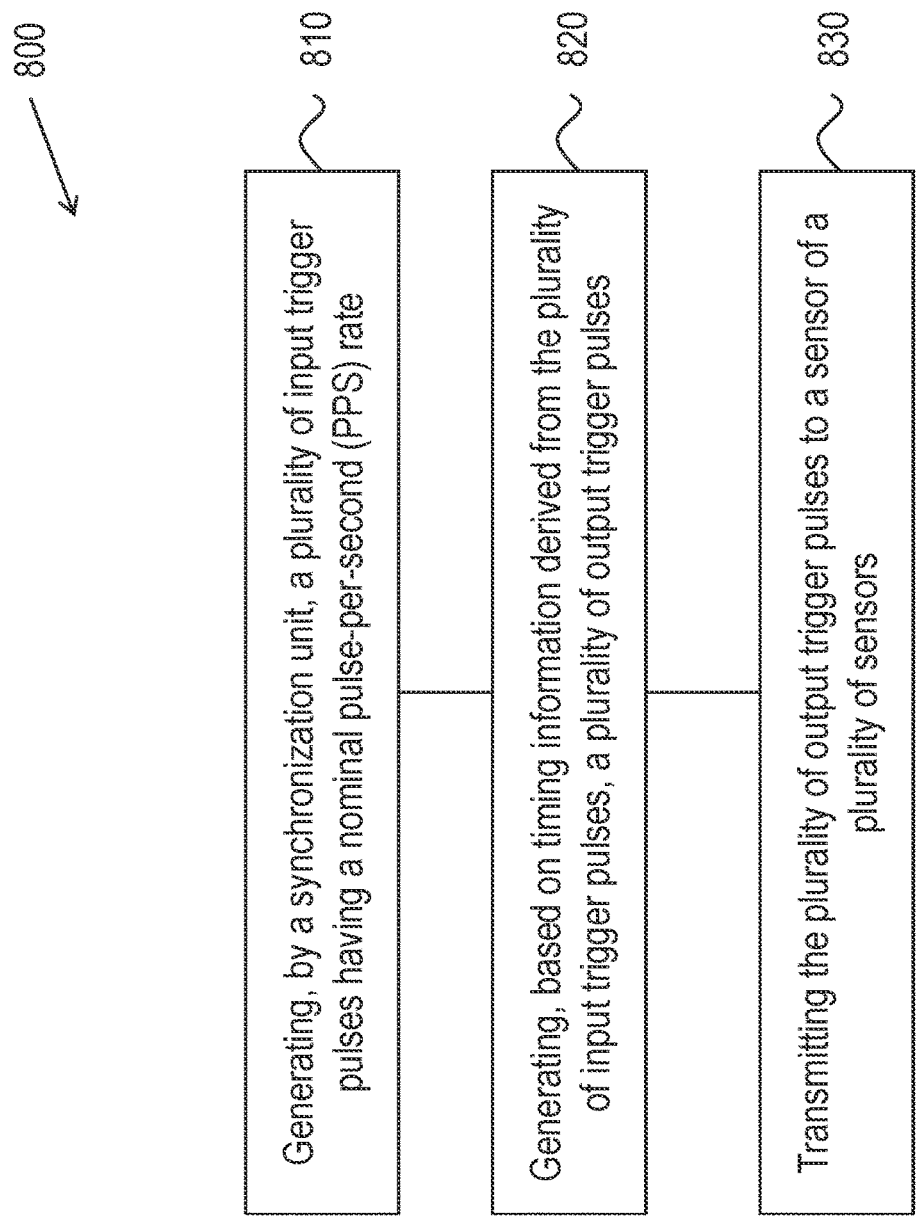
FIG. 8 shows a flowchart of an example method for synchronization in a vehicle.

FIG. 8 shows a flowchart for an example method 800 for controlling a vehicle. The method 800 includes, at operation 810, generating, by a synchronization unit (e.g., the synchronization unit shown in FIG. 6), a plurality of input trigger pulses having a nominal pulse-per-second (PPS) rate.

The method 800 includes, at operation 820, generating, based on timing information derived from the plurality of input trigger pulses, a plurality of output trigger pulses.

The method 800 includes, at operation 830, transmitting the plurality of output trigger pulses to a sensor of a plurality of sensors. In some embodiments, a frequency of the plurality of output trigger pulses corresponds to a target operating frequency of the sensor, in a case that a navigation system coupled to the synchronization unit is functioning correctly, the plurality of input trigger pulses is generated based on a nominal PPS signal from the navigation unit, and in a case that the navigation system is not functioning correctly, the plurality of input trigger pulses is generated based on a simulated clock source of the synchronization unit.

In some embodiments, the method 700 further includes the operation of receiving a reference timing signal different from the nominal PPS signal, wherein the plurality of output trigger pulses is further based on timing information derived from the reference timing signal.

In some embodiments, the reference timing signal is received from a direct universal asynchronous receiver/transmitter (UART) interface.

In some embodiments, the reference timing signal is received from a Precision Time Protocol (PTP) via an ethernet interface.

In some embodiments, the nominal PPS signal comprises a 1 Hz PPS signal.

In some embodiments, the plurality of sensors comprises a light detection and ranging (LiDAR) sensor, a camera, and an inertial measurement unit (IMU), e.g., as shown in FIG. 3.

In some embodiments, the LiDAR sensor is a spinning LiDAR sensor (e.g., 1 Hz LiDAR in FIGS. 3 and 4) or a solid-state LiDAR sensor (e.g., 10 Hz LiDAR in FIG. 3).

In some embodiments, a system for controlling a vehicle is disclosed. This system includes a sensor to provide sensing capabilities for vehicle navigation and functioning at a target operating frequency, a first navigation unit, a first synchronization unit, coupled to the sensor and the first navigation unit, to generate a plurality of input trigger pulses having a nominal pulse-per-second (PPS) rate, generate, based on timing information derived from the plurality of input trigger pulses, a plurality of output trigger pulses, and transmit the plurality of output trigger pulses to the sensor, a second navigation unit, and a second synchronization unit, coupled to the sensor and the second navigation unit, to transmit the plurality of output trigger pulses to the sensor, wherein a frequency of the plurality of output trigger pulses corresponds to the target operating frequency of the sensor, wherein, in a case that the first navigation system is functioning correctly, the plurality of input trigger pulses is generated based on a nominal PPS signal from the first navigation unit, and wherein, in a case that the first navigation unit is not functioning correctly, the plurality of input trigger pulses is generated based on a simulated clock source of the first synchronization unit.

In some embodiments, the first synchronization unit, coupled to the second navigation unit, is further configured to perform an alignment operation between a first timestamp from the first navigation unit and a second timestamp from the second navigation unit.

In some embodiments, the first synchronization unit is further configured to determine a difference between a first timestamp from the first navigation unit and a second timestamp from the second navigation unit, and switch, based on the difference exceeding a threshold, operation of the vehicle from a default operating mode to a minimal risk condition mode.

In some embodiments, the plurality of output trigger pulses is further based on timing information derived from a reference timing signal different from the nominal PPS signal, the first synchronization unit and the second synchronization unit are configured to perform a periodic exchange of heartbeat messages, and an interruption of the periodic exchange is indicative of an error in the reference timing signal.

In some embodiments, the reference timing signal is received from a Precision Time Protocol (PTP) via an ethernet interface.

In some embodiments, generating the plurality of output trigger pulses comprises synchronizing a rising edge of at least one of the plurality of input trigger pulses with a rising edge of at least one of the plurality of output trigger pulses.

In some embodiments, the sensor is a camera, and the rising edge of the at least one of the plurality of output trigger pulses corresponds to an exposure starting time of the camera.

In some embodiments, the sensor is a spinning light detection and ranging (LiDAR) unit, and the rising edge of the at least one of the plurality of output trigger pulses corresponds to a 0 degree phase of the spinning LiDAR unit.

In some embodiments, the sensor is a solid-state light detection and ranging (LiDAR) unit, and the rising edge of the at least one of the plurality of output trigger pulses corresponds to a scanning start point of the solid-state LiDAR unit.

In some embodiments, the sensor is an inertial measurement unit (IMU), and the rising edge of the at least one of the plurality of output trigger pulses corresponds to a sampling start time.

In some embodiments, a device for controlling a vehicle is disclosed. This device includes a processor configured to generate, by a synchronization unit, a plurality of input trigger pulses having a nominal pulse-per-second (PPS) rate, generate, based on timing information derived from the plurality of input trigger pulses, a plurality of output trigger pulses, and transmit the plurality of output trigger pulses to a sensor of a plurality of sensors, wherein a frequency of the plurality of output trigger pulses corresponds to a target operating frequency of the sensor, wherein a rising edge of at least one of the plurality of output trigger pulses resets at least one parameter of the sensor, wherein, in a case that a navigation system coupled to the synchronization unit is functioning correctly, the plurality of input trigger pulses is generated based on a nominal PPS signal from the navigation unit, and wherein, in a case that the navigation system is not functioning correctly, the plurality of input trigger pulses is generated based on a simulated clock source of the synchronization unit.

In some embodiments, the navigation unit is a Global Positioning System (GPS) unit, or more generally a Global Navigation Satellite System (GNSS) unit. Alternatively, or in addition, other navigation methods such as a signal triangulation method or navigation using roadside markers or landmarks may also be used.

In some embodiments, generating the plurality of output trigger pulses comprises an upsampling operation or a downsampling operation.

Figure 9:
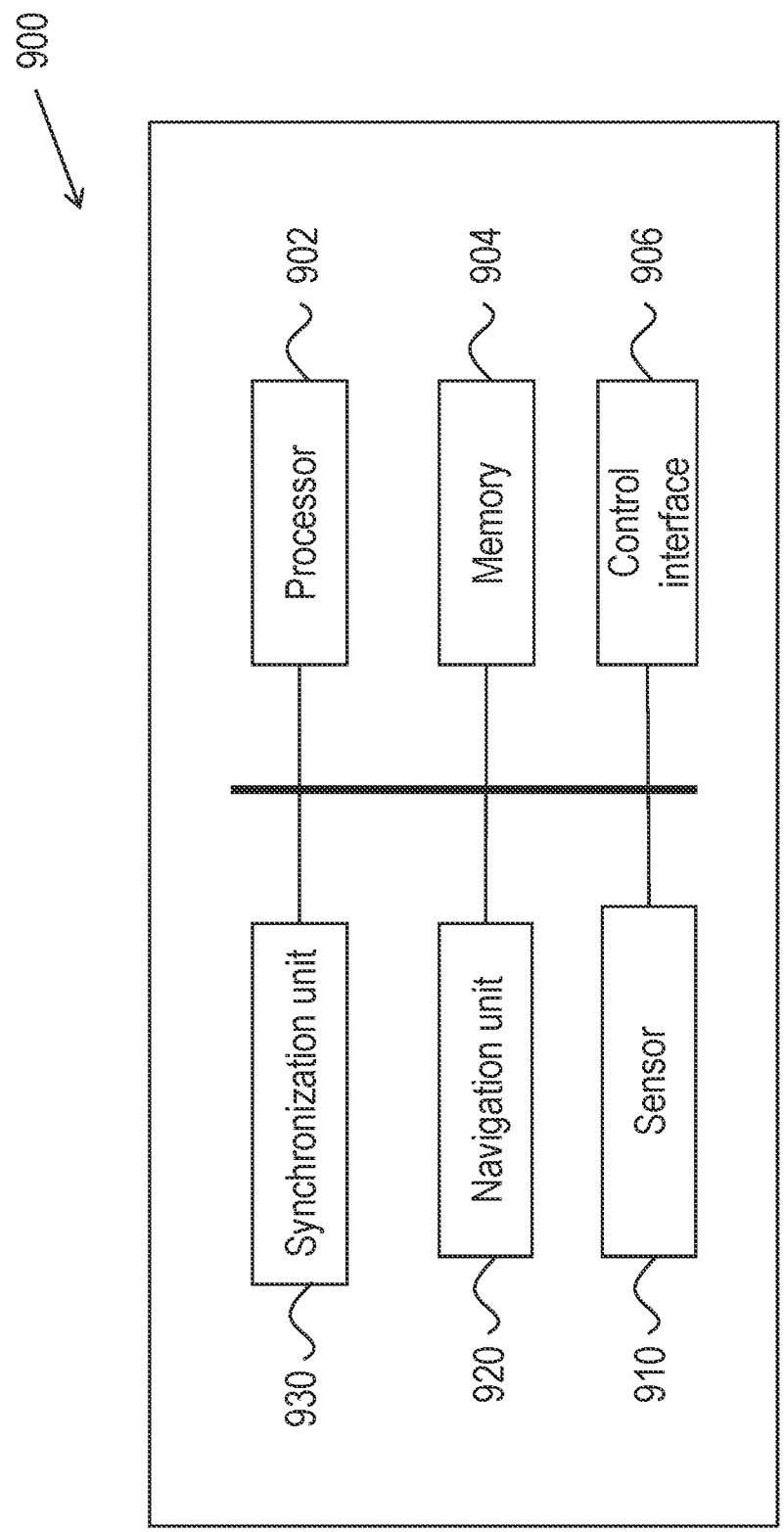
FIG. 9 shows an example of a hardware platform that can implement some methods and techniques described in the present document.

FIG. 9 shows an example of a hardware platform 900 that can be used to implement some of the techniques described in the present document. For example, the hardware platform 900 may implement method 800 or may implement the various modules described herein. The hardware platform 900 may include a processor 902 that can execute code to implement a method. The hardware platform 900 may include a memory 904 that may be used to store processor-executable code and/or store data. The hardware platform 900 may further include a control interface 906. For example, the control interface 906 may implement one or more intra-vehicular communication protocols. The hardware platform may further include a sensor 910, a navigation unit 920 and a synchronization unit 930. In some embodiments, some portion or all of the navigation unit 920 and/or the synchronization unit 930 may be implemented in the processor 902. In other embodiments, the memory 904 may comprise multiple memories, some of which are exclusively used by the navigation unit and/or the synchronization unit.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of synchronization in a vehicle, comprising:
generating, by a synchronization unit in the vehicle and based on a nominal pulse-per-second (PPS) signal, a plurality of output trigger pulses configured to synchronize operations of a plurality of sensors, each of the plurality of output trigger pulses having a frequency equal to an operating frequency of a corresponding sensor of the plurality of sensors, wherein the synchronization unit includes a synchronization module configured to adjust a phase of individual output trigger pulses of the plurality of output trigger pulses based on the nominal PPS signal;
receiving a reference timing signal different from the nominal PPS signal, wherein the plurality of output trigger pulses is further based on timing information derived from the reference timing signal;
transmitting the plurality of output trigger pulses to the plurality of sensors; and
obtaining, based on information from the synchronization unit, a triggered frequency of at least one of the plurality of sensors, wherein the triggered frequency is compared with a frequency provided by the synchronization module to detect abnormalities,
wherein, when a navigation unit in the vehicle coupled to the synchronization unit functions correctly, the nominal PPS signal is provided by the navigation unit, and
wherein, when the navigation unit does not function correctly, the nominal PPS signal is generated by a simulated clock source of the synchronization unit.

2. The method of claim 1, wherein the reference timing signal is received from a direct universal asynchronous receiver/transmitter (UART) interface.

3. The method of claim 1, wherein the reference timing signal is received from a Precision Time Protocol (PTP) via an ethernet interface.

4. The method of claim 1, wherein the nominal PPS signal comprises a 1 Hz PPS signal.

5. The method of claim 1, wherein the plurality of sensors comprise a light detection and ranging (LiDAR) sensor, a camera, and an inertial measurement unit (IMU), wherein the LiDAR sensor is a spinning LiDAR sensor or a solid-state LiDAR sensor.

6. A system for synchronization in a vehicle, comprising:
a plurality of sensors configured to provide sensing capabilities for vehicle navigation;
a first navigation unit;
a first synchronization unit, coupled to the plurality of sensors and the first navigation unit and configured to:
generate, based on a nominal pulse-per-second (PPS) signal, a plurality of output trigger pulses configured to synchronize operations of a plurality of sensors, each of the plurality of output trigger pulses having a frequency equal to an operating frequency of a corresponding sensor of the plurality of sensors, and
transmit the plurality of output trigger pulses to the plurality of sensors, wherein a triggered frequency of at least one of the plurality of sensors is compared with a frequency provided by a synchronization module in the vehicle to detect abnormalities,
wherein, when the first navigation system functions correctly, the nominal PPS signal is provided by the first navigation unit, and
wherein, when the first navigation unit does not function correctly, the nominal PPS signal is generated by a simulated clock source of the first synchronization unit;
a second navigation unit;
a second synchronization unit, coupled to the second navigation unit and configured to perform functions of the first synchronization unit when an error signal is received from the first synchronization unit,
wherein the first synchronization unit and the second synchronization unit are further configured to:
receive a timing signal comprising a timestamp corresponding to an absolute time, and
perform a periodic exchange of heartbeat messages, wherein an interruption of the periodic exchange is indicative of a failure of the first synchronization unit or the second synchronization unit, and, in an event of a failure of the first synchronization unit or the second synchronization unit, the functional synchronization unit is configured to propagate the plurality of output trigger pulses,
wherein the first synchronization unit, coupled to the second navigation unit, is further configured to transmit the timestamp to the plurality of sensors, and
wherein at least one of the first synchronization unit or the second synchronization unit is further configured to:
align a first timestamp from the first navigation unit and a second timestamp from the second navigation unit.

7. The system of claim 6, wherein at least one of the first synchronization unit or the second synchronization unit is further configured to:
determine a difference between a first timestamp from the first navigation unit and a second timestamp from the second navigation unit; and
switch, based on the difference exceeding a threshold, operation of the vehicle from a default operating mode to a minimal risk condition mode.

8. The system of claim 6, wherein the plurality of output trigger pulses are further based on timing information derived from a reference timing signal different from the nominal PPS signal.

9. The system of claim 6, wherein a rising edge of a pulse in the nominal PPS signal is aligned with rising edges of the plurality of output trigger pulses transmitted to the plurality of sensors.

10. The system of claim 9, wherein the plurality of sensors comprise a camera, and wherein the rising edge of one of the plurality of output trigger pulses corresponds to an exposure starting time of the camera.

11. The system of claim 9, wherein the plurality of sensors comprise a spinning light detection and ranging (LiDAR) unit, and wherein the rising edge of one of the plurality of output trigger pulses corresponds to a 0 degree phase of the spinning LiDAR unit.

12. The system of claim 9, wherein the plurality of sensors comprise a solid-state light detection and ranging (LiDAR) unit, and wherein the rising edge of one of the plurality of output trigger pulses corresponds to a scanning start point of the solid-state LiDAR unit.

13. The system of claim 9, wherein the plurality of sensors comprise an inertial measurement unit (IMU), and wherein the rising edge of one of the plurality of output trigger pulses corresponds to a sampling start time of the IMU.

14. A device for synchronization in a vehicle, comprising:
a processor configured to:
  generate, based on a nominal pulse-per-second (PPS) signal, a plurality of output trigger pulses configured to synchronize operations of a plurality of sensors, each of the plurality of output trigger pulses having a frequency equal to an operating frequency of a corresponding sensor of the plurality of sensors; and
  transmit the plurality of output trigger pulses to the plurality of sensors,
  wherein a triggered frequency of at least one of the plurality of sensors is compared with a frequency provided by a synchronization module in the vehicle to detect abnormalities,
  wherein, a rising edge of at least one of the plurality of output trigger pulses resets at least one parameter of a sensor of the plurality of sensors, wherein, when a navigation unit in the vehicle functions correctly, the nominal PPS signal is provided by the navigation unit, and
  wherein, when the navigation unit does not function correctly, the nominal PPS signal is generated by a simulated clock source of the synchronization unit.

15. The device of claim 14, wherein the navigation unit is a Global Positioning System (GPS) unit, and wherein the plurality of output trigger pulses are generated by an upsampling operation or a downsampling operation on the nominal PPS signal.

16. The method of claim 1, wherein generating the plurality of output trigger pulses comprises aligning a rising edge of a pulse in the nominal PPS signal with rising edges of the plurality of output trigger pulses.

17. The method of claim 1, wherein generating the plurality of output trigger pulses comprises upsampling or downsampling the nominal PPS signal.

* * * * *